United States Patent [19]

Saunders et al.

[11] Patent Number: 4,719,646
[45] Date of Patent: Jan. 12, 1988

[54] X-RAY APPARATUS WITH SOURCE DISTORTION COMPENSATION

[75] Inventors: Gerald A. B. Saunders, Sydenham; Theodore D. V. Cooke; David W. Siu, both of Kingston, all of Canada

[73] Assignee: Queen's University, Kingston, Canada

[21] Appl. No.: 860,953

[22] Filed: May 8, 1986

[51] Int. Cl.⁴ .............................................. G03B 41/16
[52] U.S. Cl. .................... 378/179; 378/162; 378/174; 378/177; 378/208
[58] Field of Search ............. 378/177, 179, 180, 174, 378/205, 208, 209, 162

[56] References Cited

U.S. PATENT DOCUMENTS

| | | | |
|---|---|---|---|
| 2,552,592 | 5/1951 | Rush | 378/208 |
| 2,568,191 | 9/1951 | Grimm | 378/208 |
| 3,524,057 | 8/1970 | Hammonds | 378/179 |
| 4,048,507 | 9/1977 | de Gaston | 378/205 |

Primary Examiner—Janice A. Howell
Assistant Examiner—David P. Porta
Attorney, Agent, or Firm—Richard J. Hicks

[57] ABSTRACT

The apparatus enables the taking of multiple X-ray photographs of the legs and pelvis of a patient. A platform is rotatably mounted on a base member, and is provided with means for keeping the patient still in a standardized standing position. With only minor vertical and horizontal adjustment of an associated substantially point source of X-rays, side and front X-rays can be taken without movement of the patient, apart from rotation of the platform. Radio opaque marker means provided on otherwise radio-transparent spaced screens produce, on the X-ray film, images which can be interpreted to provide information for compensation of distortions in images on the X-ray film due to the use of a point source of radiation.

23 Claims, 11 Drawing Figures

X-RAY APPARATUS WITH SOURCE DISTORTION COMPENSATION

FIELD OF INVENTION

This invention relates to apparatus used in the preparation of X-ray photographs of the lower parts of a patient. One specific use of such apparatus is the preoperative study of the leg bone and hip and knee joint structures and their alignment and specific orientation of a patient, with a view to the operative correlation of deformity and/or replacement of part of a hip or knee joint with an artificial member.

BACKGROUND TO INVENTION

Canadian Pat. No. 1165473 entitled STANDARD KNEE RADIOGRAPH issued Apr. 10, 1984 to Queen's University at Kingston; Canada relates to apparatus having a similar objective but limited to assessment of alignment of the knee. The patient stands in a standard frame and X-ray photographs are taken from a point source of X-rays. There is no provision for moving the patient relative to that source, so that assessment of alignments from different angles is difficult and awkward for both the patient and the radiological technician.

OBJECT OF THE INVENTION

An object of the invention is the provision of an apparatus to provide more complete information regarding the relative orientations of various parts of the bony structure of the lower body of a human patient, which can be moved to any selected orientation relative to a source of X-rays, simply and easily by a technician without the necessity of moving the patient relative to the apparatus.

STATEMENT OF THE INVENTION

According to the present invention, an apparatus adapted to facilitate the interpretation of multiple X-ray photographs of the legs and pelvis of a patient comprises a base member, a platform on which a patient can stand and which is mounted on the base member, guide means restraining the platform to rotation about a vertical axis between a plurality of orientations relative to said base member, and racks carried by one of said platform and said base member and adapted for the reception of vertically extending flat X-ray film cassettes, the base member, the platform and all parts rotatable with the platform being so arranged as to permit radiation in sequence of X-ray film cassettes in the different said racks with only minor vertical and horizontal adjustment of an associated substantially point source of X-rays. In a further, preferred, embodiment there are further provided first and second vertical sheets of radially aligned material transparent to X-rays mounted on the base member and extending parallel to one another at different radial distances from the said vertical axis, on the first sheet a first arrangement of radio opaque markers, and on the second sheet a second arrangement of radio opaque markers, the relative positions of images of the first and second arrangements of markers on an exposed X-ray film providing information from which distortions in images on the X-ray film due to the use of substantially point source of X-rays can be compensated for.

BRIEF DESCRIPTION OF THE DRAWINGS

The invention will now be described, by way of example, with reference to the accompanying drawings, in which.

DESCRIPTION OF PREFERRED EMBODIMENTS

Figure 1:
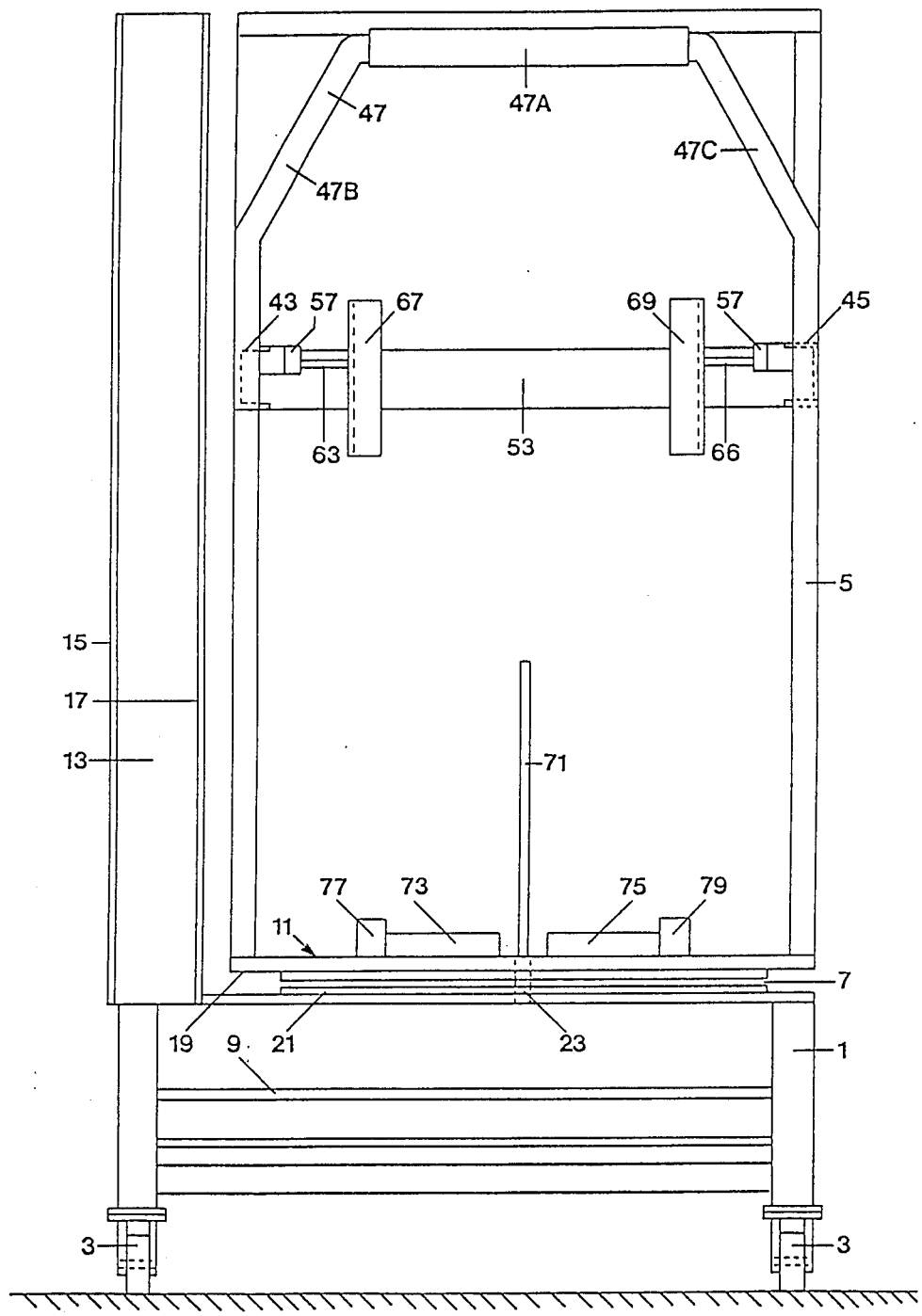
FIG. 1 is a front elevation of a patient positioning device incorporating the present invention.
Figure 2:
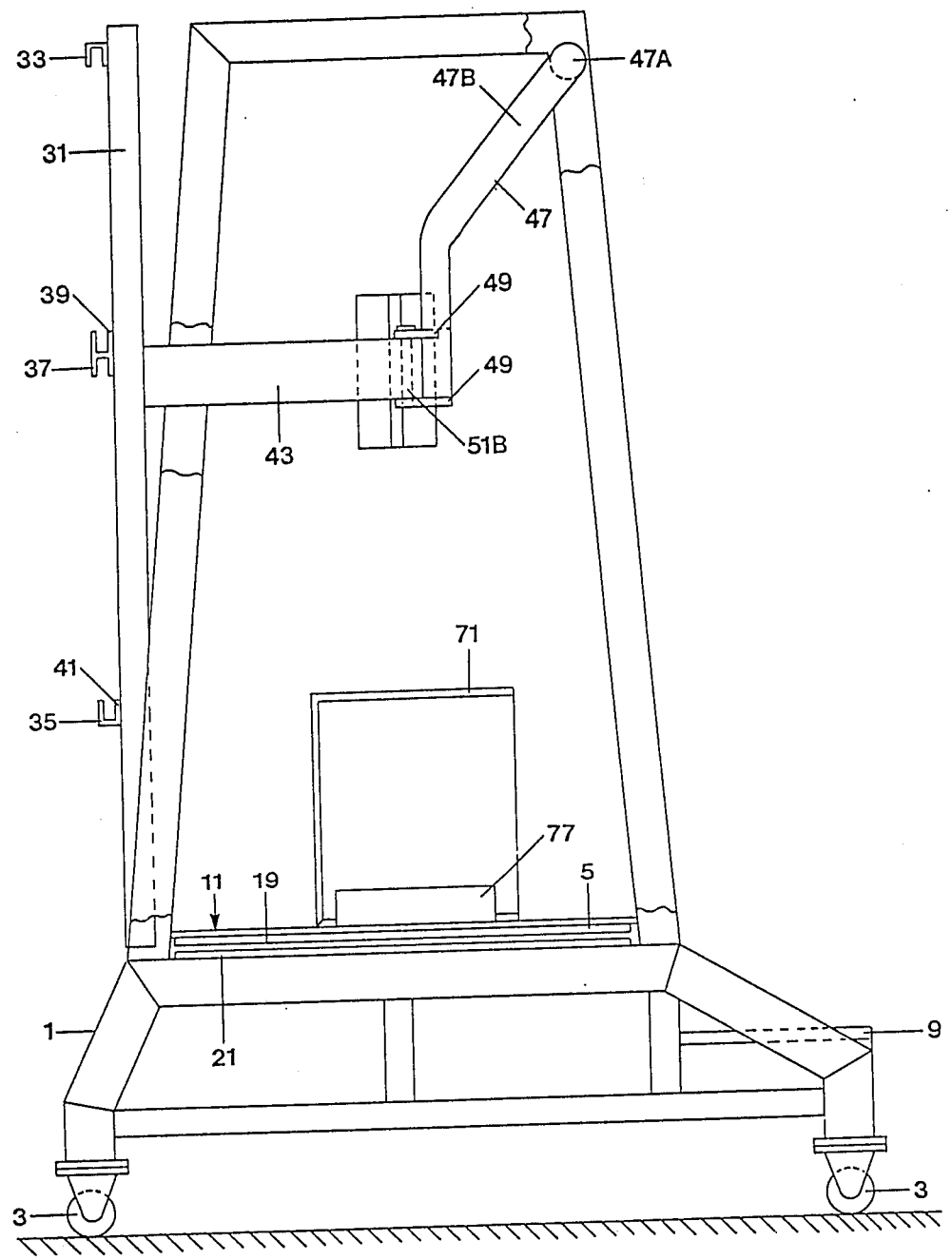
FIG. 2 is a side elevation as seen from the left-hand side of FIG. 1; certain foreground detail being partially broken away to show important details more clearly.

The patient positioning device shown in the accompanying drawings (FIGS. 1 to 7) comprises basically a base part 1 mounted on a plurality and preferably four castoring wheels 3, and a rotatable part 5 mounted on base part 1 through a vertical pivotal axis 7. It is to be appreciated that in a preferred embodiment the rotatable part 5 can rotate only through an angle of 270 degrees, and is limited to that range of movement by suitable stops, not detailed. This is to prevent mechanical interference between base part 1 and rotatable part 5. In alternative embodiments (not shown) part 5 may be circular and rotatable through 360 degrees.

Base part 1 is provided with a step 9 by which a patient can mount a platform 11 on the rotatable part 5. It also carries an upwardly extending rigid framework 13, to the left of FIG. 1. Framework 13 carries two parallel vertical sheets 15 and 17 of plexiglass, having a thickness of ¼ inch and spaced apart a distance of four inches. It will be seen that the two sheets are at different radial spacings from the axis of pivotal axis 7.

Rotatable part 5 on its underside is provided with a circular steel plate 19 maintained in alignment with a similar steel plate 21 carried by base part 1, by a central spindle 23 forming the vertical pivotal axis 7. The arrangement is shown most clearly in FIGS. 4 and 5. The weight of the rotatable part 5 is carried by a plurality, in FIG. 5, of eight steel balls 25, each carried in its own individual housing 27 fitted into an opening in plate 21. As will be seen from a careful study of FIG. 5, the eight balls 25 are disposed at different radial distances from spindle 23. It has been found in practice that in time such a ball will wear a small circular track in the upper steel plate which transmits the weight of the rotatable part 5 and the patient on it. Were it possible to ensure that all balls would wear one and only one track, no problem would arise. Since that does not happen in practice, rotation becomes subject to juddering as balls jump from one such track to the next and back again. By purposely arranging the balls at different radial distances from the spindle, the eight balls form a plurality of eight distinct spaced concentric tracks, and there is no problem due to balls jumping from one track to the next. It will be appreciated that other rotatable bearing means such as roller bearings could equally well be employed in place of the ball bearings specifically described.

The rotatable part 5 comprises platform 11, underneath which is mounted the plate 19, and two spaced uprights 31 carried by the platform. Two channel members 33 and 35 and a H-section member 37 extend horizontally between uprights 31 and form an upper rack 39 and a lower rack 41 arranged to accommodate standard X-ray film cassettes. Welded to uprights 31 are two channel section arms 43 and 45, which extend horizontally forwardly above the two sides of the platform 11. A tubular handlebar 47 is shaped to provide an upper horizontal grip portion 47A located some 42 inches above the platform 11. Two end portions 47B and 47C are bent to extend downwardly to near the forward ends of the arms 43 and 45 respectively. These ends 47B and 47C are provided with sidewardly extending lugs 49 through which vertical pins 51B and 51C respectively detachably connect end portions 47B and 47C to the two arms 43 and 45.

The upper ends of the two uprights 31 are connected together by a horizontal channel member 53, and near each of the arms 43 and 45 a vertical pivot pin 55 carries a forwardly extending bar 57. Each bar is provided with a lug 59 which extends over the adjacent arm 43 or 45. A bolt on the arm extends through a slot in the lug. A wing nut 61 carried by that bolt can be tightened to secure the bar 57 in a desired angular orientation about the pin 55. The forward end of each bar 57 is pivotally connected to a shaft 63 or a shaft 66 which carries a plate 67 or 69 bent to form a channel member of V cross section. The shaft in each case is offset from the centre of the length of the plate, so that the plate can be set at either a lower level or a higher level. The objective of this arrangement will be explained in the description below of the operation of the apparatus.

Figure 3:
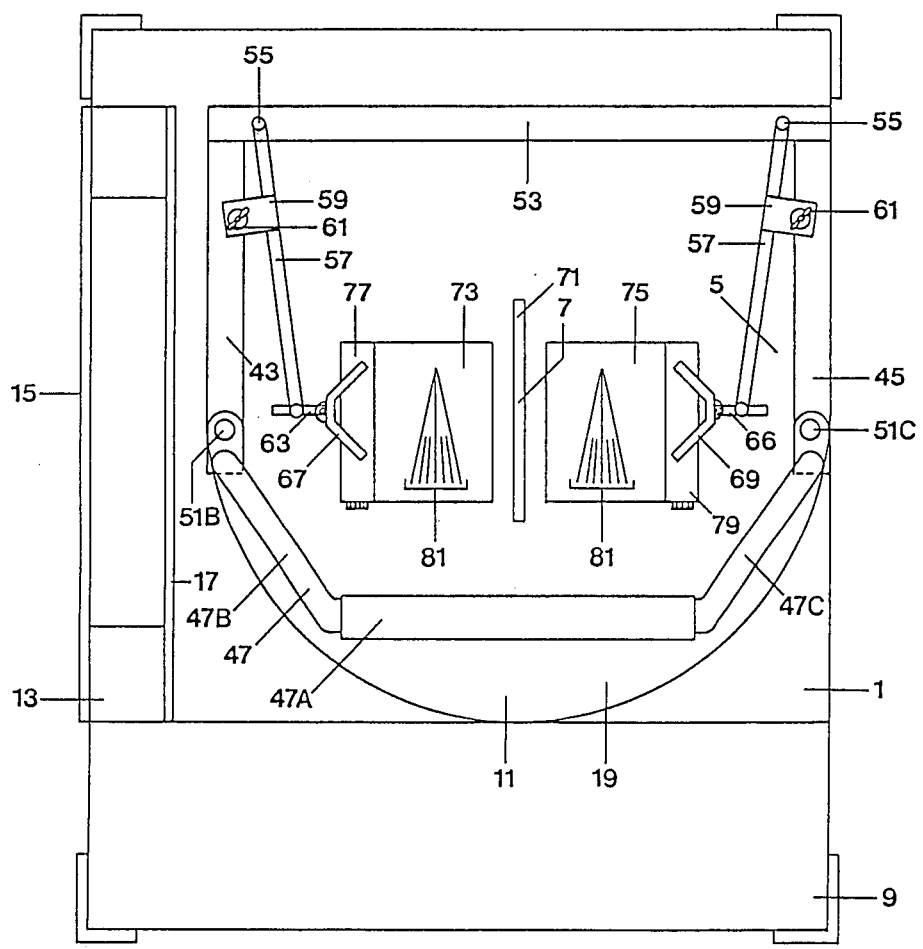
FIG. 3 is a plan view of the device shown in FIGS. 1 and 2.
Figure 4:
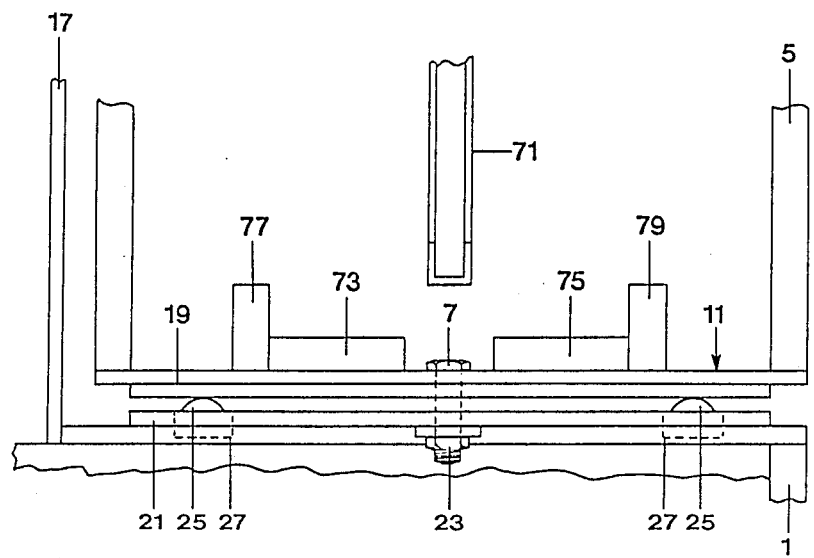
FIG. 4 is a front elevation showing in greater detail than FIG. 1 the manner in which an upper rotatable part is mounted on a lower base part; certain details are omitted by drawing this view as taken on the line IV—IV of FIG. 5.
Figure 5:
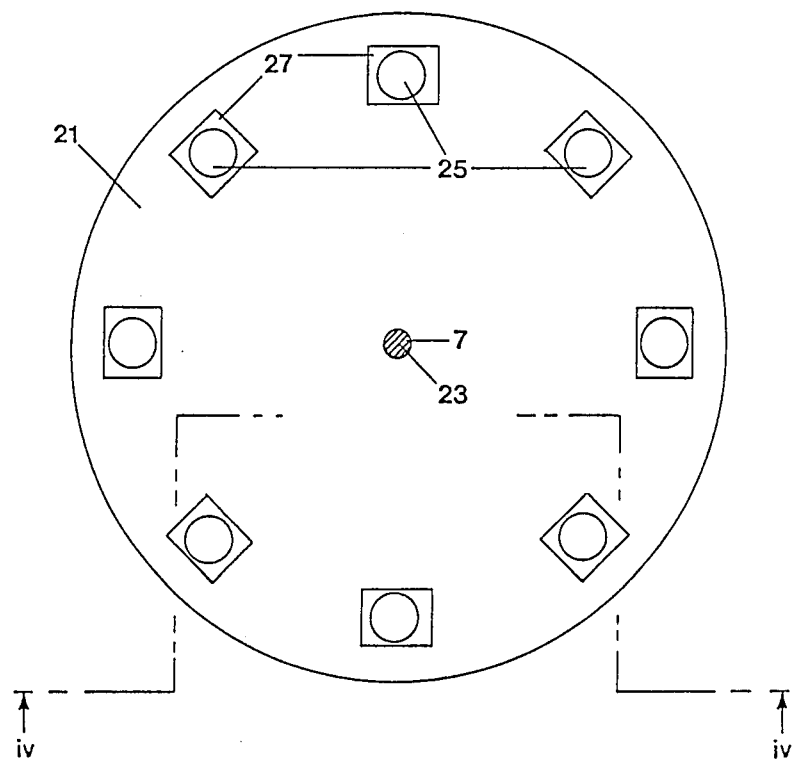
FIG. 5 is a plan view of a bearing plate and associated supporting balls by which the rotatable part is supported and positioned.

It will be noted from FIG. 3 that the forward end of the platform 11 is shaped as an arc with the pivotal spindle 23 as centre. Thus the platform 11 can be rotated in a clockwise direction through 90, through 180 degrees or any angle intermediate therebetween from the position shown in FIGS. 1 to 3, without any portion of the rotatable part 5 engaging the arrangement of plexiglass sheet 17, which is, of course, fixed as being mounted on the base 1. In an alternative embodiment platform 11 can be rotated through 270 degrees or by suitable adjustment of the locks, through 360 degrees.

The platform 11 also carries a rack 71 formed of channel section material of such size that a standard X-ray cassette can be inserted into it from the front of the positioning device. Two body weighing machines 73 and 75, of the same general type as bathroom scales, but of small size each to accommodate only one foot of a patient on the platform 11, may be positioned on opposite sides of the rack 71 if desired. Two magnetic blocks 77 and 79 are disposed at the outward sides of the machines 73 and 75. Each of these blocks contains a powerful permanent magnet, the poles of which are adjacent to the steel plate 19. A knob on the front of each block can be rotated to move a magnetic shunt in and out of a position between those poles of the magnet. With the poles unshunted, the block is very firmly attracted against the steel plate 19. When the shunt is between the poles, the magnetic attraction to the plate is almost completely eliminated. The block can then be moved to a desired new position and the shunt rendered ineffective so that the block is again held firmly in place. These blocks extend upwardly above the level of the tops of the weighing machines 73 and 75. In this manner they prevent outward movement of both of the associated weighing machines and also each of the feet of a patient standing on the machine. The upper surface of each weighing machine is provided with a system of diverging lines 81 as indicated in FIG. 3, the purpose of which will be described below.

Figures 6, 7:
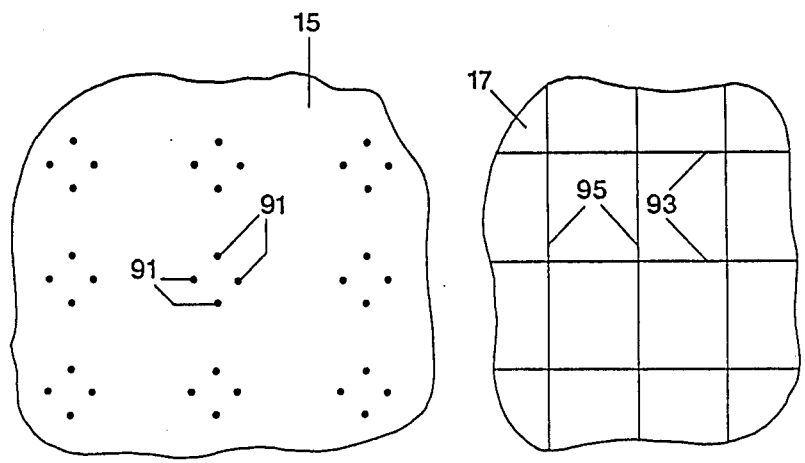
FIG. 6 is a fragmentary side elevation of a panel shown in FIG. 1 and of radio opaque markers thereon.
FIG. 7 is a fragmentary side elevation of a second panel shown in FIG. 1 and of radio opaque markers thereon.

Referring now to FIGS. 6 and 7, these show respectively arrangements of radio-opaque markers provided on the two plexiglass sheets 15 and 17. Plexiglass is itself transparent to X-rays. Sheet 15 is provided with an arrangement of markers consisting of a number of horizontally and vertically spaced steel balls 91. On an X-ray photograph taken by radiation from a substantially point source of X-rays, directed through the sheet 15, the balls will produce dot-like images. Sheet 17 is provided with an arrangement of markers consisting of a number of horizontally extending but vertically spaced steel wires 93, and a number of vertically extending but horizontally spaced steel wires 95. On an X-ray photograph taken by radiation from a substantially point source of X-rays, directed through the sheet 17, the wires 93 and 95 will produce line-like images.

Figure 10:
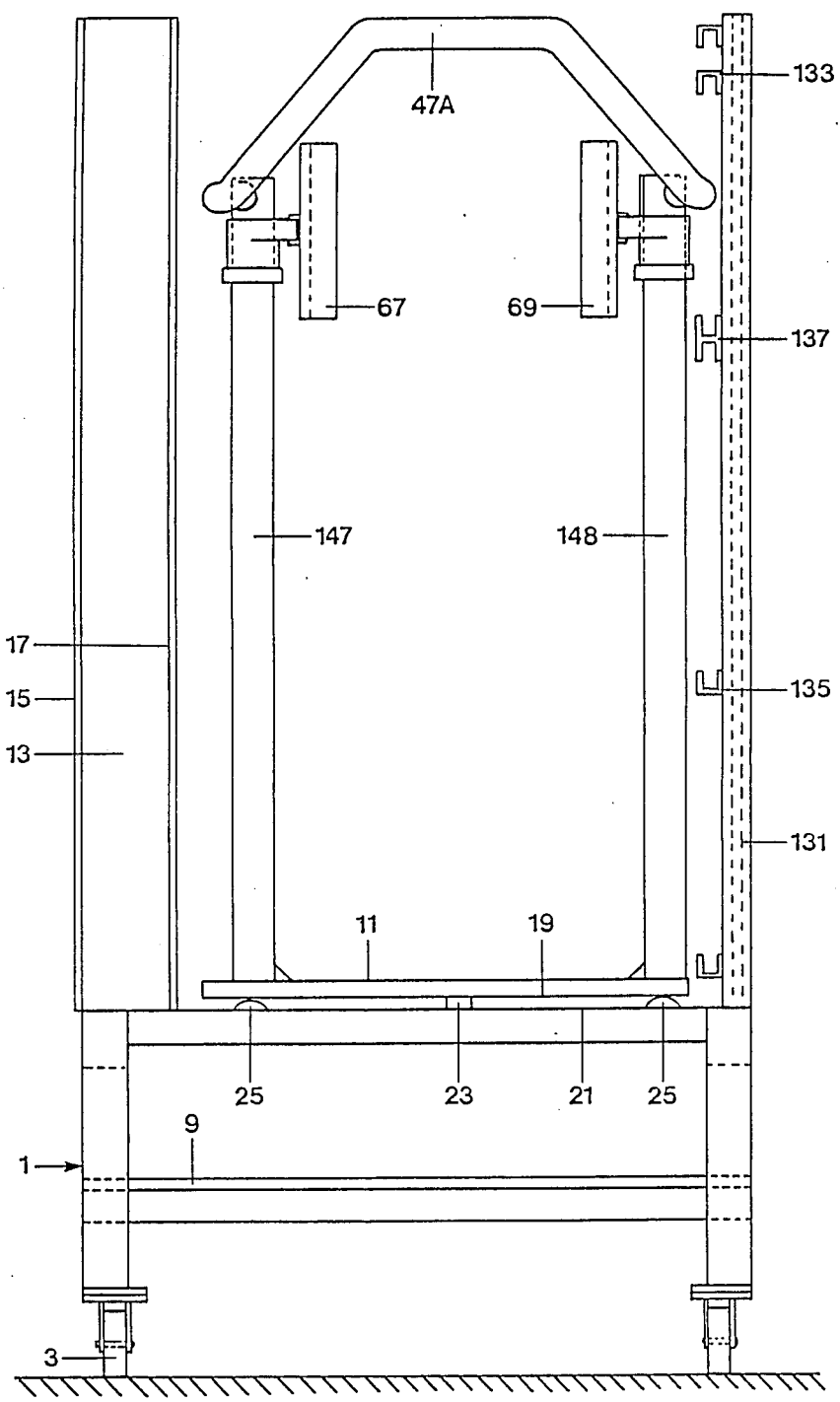
FIG. 10 is a front elevation of an alternative, preferred embodiment of the invention.
Figure 11:
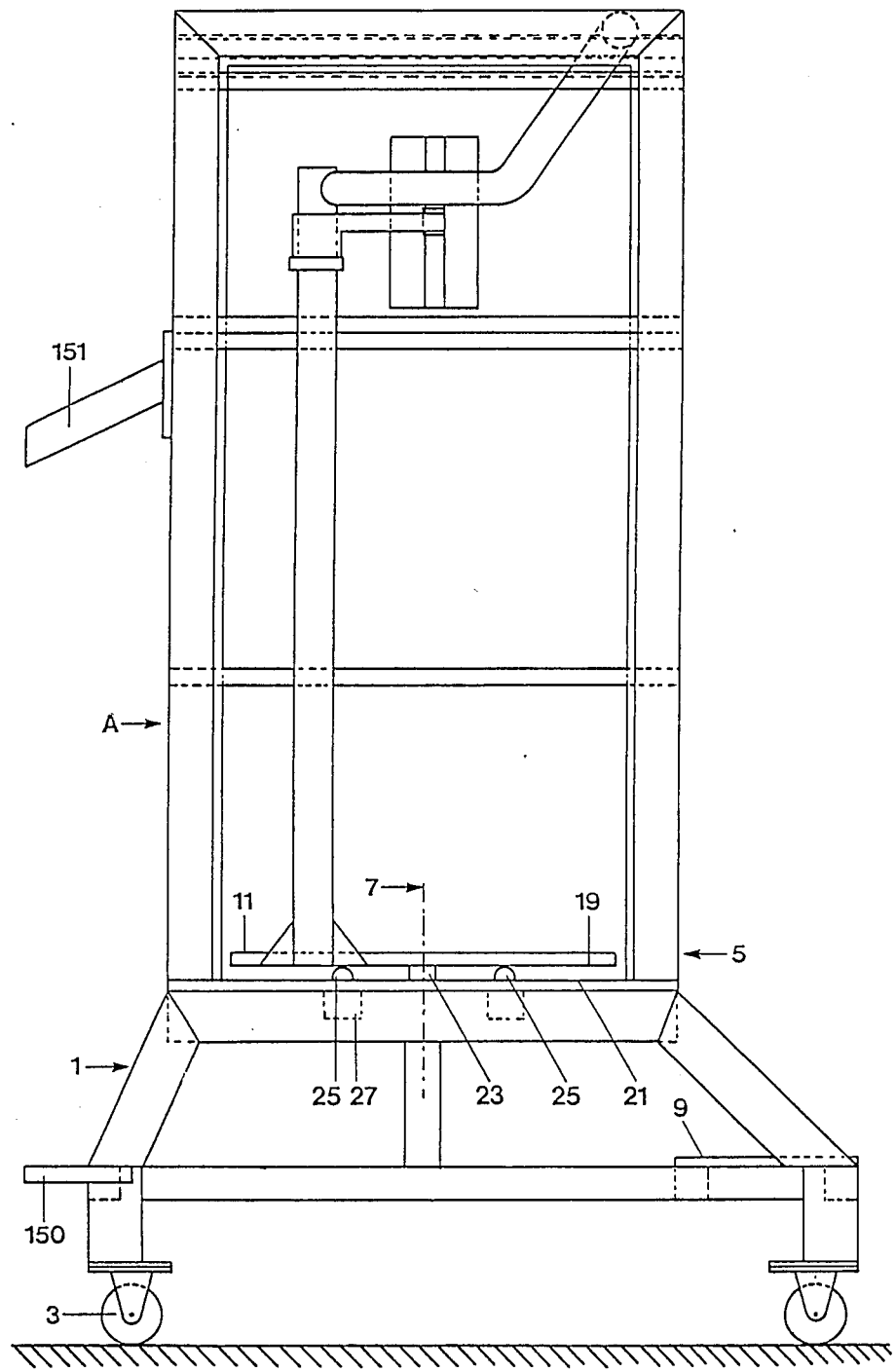
FIG. 11 is a side elevation of the embodiment of FIG. 10.

Referring now to the alternative, and preferred, embodiment illustrated in FIGS. 10 and 11, identical parts have been identified by the same reference numerals as in the embodiment of FIGS. 1 to 7. In FIGS. 10 and 11, the frame 31 and associated X-ray plate holders 33, 35, 37 which in the first embodiment of FIGS. 1 through 7 is mounted on platform 11 for rotation therewith about vertical axis 7, is replaced by a frame 131 and associated X-ray plate holders 133, 135, 137 which is rigidly vertically mounted on the base 1 in a plane parallel and spaced from the plane of the two plexiglass marker sheets 15 and 17, on the opposite side of the rotatable platform 11.

The diameter of rotatable platform 11 is reduced slightly so that it may be rotated freely in the space between plexiglass sheet 17 and frame 131. Handlebar 47A, instead of being mounted on frame 31, is mounted on spaced parallel support members 147, 148 which in turn are secured, preferably by welding, to rotatable platform 11. In operation the patient enters the device from the side marked A in FIG. 11, aided by an intermediate step 150 and handlebars 151. With the spring loaded hip pads preset at an approximately correct location, with respect to the height of the patient, the patient is centered medio-laterally and locked into position with his hands lightly holding handlebar 47A. An adjustable belt (not shown) may be placed behind the pelvis as a safety precaution. The ankles are placed against the ankle blocks 77, 79 set vertically below the centre of each hip. Each knee is placed in true anterior-posterior position by directing the patella straight ahead and checking the plane of knee flexion. Foot rotation may then be recorded as an angulation of the second toe with the AP axis using the template 81 described hereinbelow.

A portable loaded cassette holder may then be inserted between the knees and a lateral radiograph of the left knee is taken with the X-ray tube aiming at knee center. The platform 11 is rotated 90 degrees counter-clockwise and isolated AP radiographs of both knees and hips can be taken, as described above. The platform 11 is rotated a further 90 degrees counter-clockwise and a final lateral radiograph of the right knee can be taken. Finally the platform is rotated a further 180 degrees either hand to return to the original position so that the patient can dismount backwards down step 150. It will be appreciated that once the patient has been set up in the frame, no further movement of the patient is required and the frame can be simply rotated to achieve any desired orientation. With this configuration it is possible to obtain radiographs in any desired orientation including obliques.

OPERATION AND USE OF DESCRIBED EMBODIMENTS

In use of the apparatus described above with reference to FIG. 1 to 7, the platform 11 is rotated to face in the direction shown in FIGS. 1 to 3. Pin 51B is removed and the handle bar 47 is rotated about pin 51C to extend forwardly from arm 45. A patient is then assisted to mount the step 9 and platform 11. He then will be facing the rear of the apparatus, and is assisted to turn round so that he is facing the front of the machine. Handle bar 47 is returned to the position shown in FIGS. 1 to 3, and locked in place by insertion of pin 51B.

The patient is assisted to stand with his two feet, in his normal standing position, respectively on the two weighing machines 73 and 75. Usually the two blocks 77 and 79 remain at a predetermined optimum distance apart. If considered necessary they can be rendered ineffective by shunting of their magnets, adjusted to a different spacing, and the shunts then withdrawn to lock them in their new positions. The patient is required to stand with his two feet respectively touching these two blocks. The two plates 67 and 69 are adjusted inwardly firmly to grip the two hip bones of the patient. It will be appreciated that by inversion of the two plates 67 and 69, the vertical extent of the two plates can be changed to suit the height of the patient. An X-ray film cassette is inserted in the rack 71 between the legs of the patient, and the patient caused to assume his normal standing position, holding the grip portion of 47A of the handlebar 47.

The radiologist then makes a note of the orientation of each foot of the patient, using the graduation lines 81, and makes a note of the weight carried by each foot of the patient, using the two weighing machines 73 and 75. The X-ray machine, like most X-ray machines, makes use of a substantially point source of radiation. Associated with the source of radiation is a light beam which enables the radiologist to adjust the point source so that it will be directed at the desired point on the leg of the patient. The radiologist then retires to the associated control cubicle and activates the X-ray machine to expose the film in rack 71.

The procedure described above produces an X-ray of the right leg of the patient, taken from the side. The platform 11 can now be rotated in a clockwise direction through 90 degrees, an X-ray film cassette inserted into the lower rack 41 at the rear of the platform 11, and the X-ray source used to produce an X-ray photograph of the knees and lower legs of the patient, taken from the front. If desired separate X-ray films may be used to photograph each leg in turn. A further X-ray cassette is then inserted into the upper rack 39 at the rear of platform 11, and the X-ray source used to produce an X-ray photograph of the upper parts of the two legs of the patient, taken from the front. After a further clockwise rotation of platform 11 through 90 degrees, an X-ray film cassette is inserted into the rack 71 between the legs of the patient, and an X-ray photograph taken of the left leg of the patient, taken from the side.

It will be seen that once the patient is properly positioned on the platform 11, the radiologist can in rapid sequence, and without changing the position of the patient (apart from rotation of the platform 11) take the four X-ray photographs typically required. It has been found that, using the machine of the present invention, it is possible to complete the radiography of a patient in a very few minutes, compared with some 30 minutes using prior alternative machines and techniques such as described in Canadian Pat. No. 1,165,473. This is much less tiring for the patient who, in most cases, suffers pain or discomfort when standing. Further, since in most hospitals a medical specialist will hold a clinic only certain days of the week, during such a clinic day there is a requirement to X-ray many patients having leg or hip disorders. Time taken per patient becomes critical in determining patient throughout by the specialist.

The function of the markers 91, 93 and 95 on the two plexiglass sheets 15 and 17 is to permit a modified diagram to be prepared, based on the X-ray photograph but with compensation for errors of parallax arising from the use of a point source of radiation as the X-ray source. For many medical purposes, these errors are not of critical importance, but for others such as when a prosthetic device is to be manufactured before implantation surgery takes place, this correction becomes most important.

Figure 8:
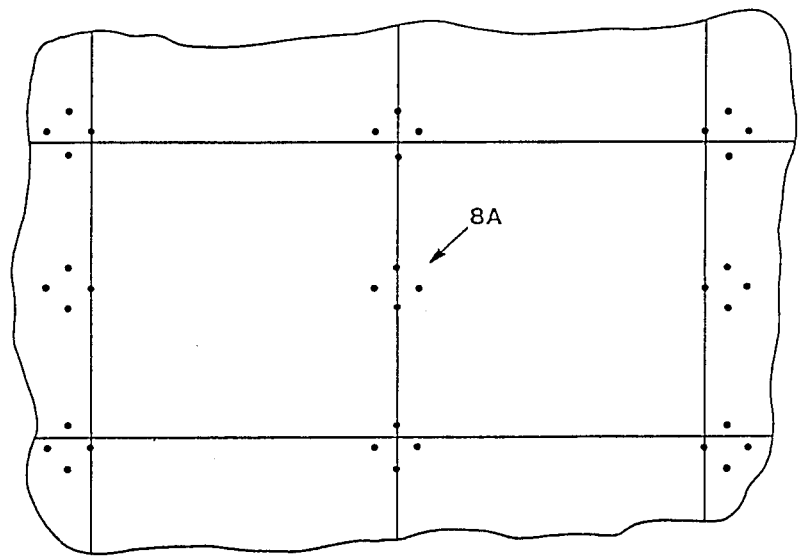
FIG. 8 is a fragmentary reproduction of an exposed X-ray film.

FIG. 8 indicates the appearance of these markers on an X-ray photograph. No image of the patient occurs in FIG. 8, in view of professional restraints on inclusion of patient information. It will be seen that in the central part 8A of FIG. 8, which corresponds to the area of the patient at which the X-ray source was optically directed, the images of balls 91 are evenly spread about the image of the vertical wire. However, to the left of the central wire 95 the images of balls 91 are displaced to the left of the nearby vertical wire 95. While to the right of the central wire 95, the images of balls 91 are displaced to the right of the nearby wire 95. Similarly, above the central part 8A, the images of balls 91 are displaced above the image of the nearby wire 93, while below the central part 8A, the images of balls 91 are displaced below the image of the nearby wire 93.

Although the actual interpretation of the additional information provided by the displacement of the dot images from the line images is not part of the present invention, one process which can be used will be described below.

First, the actual X-ray photograph is placed on the work table of a digitizer. Such digitizers are well known such as a Hipad connected to a Hwelett Packard desk top computer, and include a cursor which can be moved to any desired point on the work table. The digitizer then automatically provides the x and y coordinates of the point. Working from a reference point selected on the X-ray photograph, the x and y coordinates of each relevant point on the photograph are found. These include the x and y coordinates of each of the ball images, and points of intersection of the line images. It is necessary to know certain relevant dimensions of the apparatus, including:

the distance between the two sheets 15 and 17;
the distance of the patient from sheet 17; and
the distance from sheet 17 to the X-ray film, this being the perpendicular distance.

Figure 9:
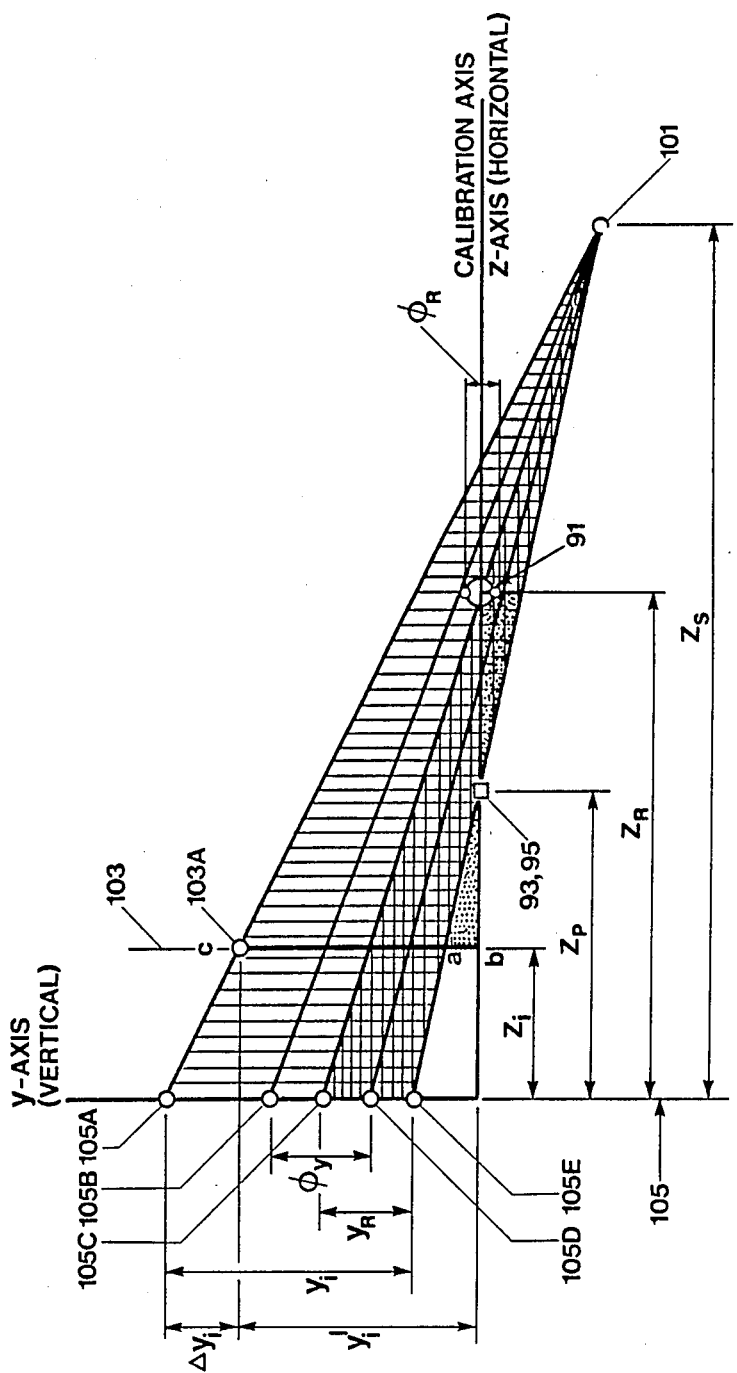
FIG. 9 is a diagram relating to the interpretation of an X-ray photograph produced on the device.

FIG. 9 indicates one approach to finding the correction required for a given point on the film. In that Figure, a point source of X-rays 101 illuminates an X-ray film 105, the X-rays passing through radio transparent screens 15 and 17 bearing respectively a substantially circular pattern of radio opaque ball markers 91 of average diameter OR and a grid of radio opaque line markers 93, 95. A bone 103 being X-rayed includes a feature at 103A which will produce an image at 105A on film 105 while markers 91, will produce images 105B and 105D, about a centre 105C of diameter Oy and markers 93, 95 will produce an image 105E.

By the principle of similar triangles, the X-ray source distance $Z_s$ can be calculated $$Z_s = \frac{(\phi_y)(Z_R)}{(\phi_y - \phi_R)}. \qquad 1$$

$\Delta_1$ which is the error in position of the anatomical point 103A on the radio graph 105 can then be derived and correction for parallax can be introduced so as to give the true position of the point 103A on the radiograph.

$$y_i = y_i\left(\frac{Z_s - Z_i}{Z_s}\right) + y_r\left(\frac{Z_s - Z_r}{Z_s}\right)\left(\frac{Z_p - Z_i}{Z_r - Z_p}\right). \qquad 2$$

The procedure can then be repeated for the x coordinate by rotating through 90°.

Thus:

$$x_i = x_i\left(\frac{Z_s - Z_i}{Z_s}\right) + x_r\left(\frac{Z_s - Z_r}{Z_s}\right)\left(\frac{Z_p - Z_i}{Z_r - Z_p}\right). \qquad 3$$

We claim:

1. An apparatus for taking multiple X-ray photographs of the legs and pelvis of a patient, comprising a base member, a platform on which a patient can stand and which is mounted on the base member, guide means restraining the platform to rotation about a vertical axis between a plurality of orientations relative to said base member, two separate weight measuring devices mounted on said platform to indicate respectively the weight borne by the two feet of said patient and racks carried by said platform for the reception of vertically extending flat X-ray film cassettes, the base member, the platform and all parts rotatable with the platform permitting radiation in sequence of X-ray film cassettes in different said racks with only minor vertical and horizontal adjustment of an associated substantially point source of X-rays.

2. An apparatus according to claim 1, in which the platform is provided with two adjustable clamps arranged respectively to engage and to restrain the two hips of a patient standing on the platform, and a pair of adjustable blocks for restraining movement of the feet of the patient.

3. An apparatus according to claim 2, in which the adjustable clamps are in the form of vertically extending channels of substantially V cross section, the open side of each V being directed towards the patient.

4. An apparatus according to claim 2, in which said separate weight measuring devices are provided inwardly of said pair of adjustable blocks.

5. An apparatus according to claim 4, in which the upper surface of each weight measuring device is provided with graduations which permit reading of the orientation of a patient's foot on that weight measuring device.

6. An apparatus according to claim 1, in which the guide means include a central spindle locating the platform against sideward movement relative to the base member, a plurality of rotatable bearing means on the base member at different angular orientations about the central spindle and at different radial distances from that central spindle, and a rigid bearing surface on said platform to transmit the weight of the platform and any patient thereon to the rotating bearing means and thus to the base member.

7. An apparatus as claimed in claim 6 wherein said rotatable bearing means comprise ball bearings.

8. An apparatus for taking multiple X-ray photographs of the legs and pelvis of a patient, comprising a base member, a platform on which a patient can stand and which is mounted on the base member, guide means restraining the platform to rotation about a vertical axis between a plurality of orientations relative to said base member, two separate weight measuring devices mounted on said platform to indicate respectively the weight borne by the two feet of said patient, racks carried by said platform for the reception of vertically extending flat X-ray film cassettes, the base member, the platform and all parts rotatable with the platform permitting radiation in sequence of X-ray film cassettes in different said racks with only minor vertical and horizontal adjustment of an associated substantially point source of X-rays, first and second vertical sheets of material transparent to X-rays mounted on the base member and extending parallel to one another at different radial distances from the said vertical axis, on the first sheet a first arrangement of radio opaque markers and on the second sheet a second arrangement of radio opaque markers, the relative positions of images of the first and second arrangements of markers on an exposed X-ray film providing information for composition of distortions in images on the X-ray film due to the use of a substantially point source of X-rays.

9. An apparatus as claimed in claim 8, in which the first arrangement of markers comprises a plurality of horizontally and vertically spaced dots, and the second arrangement of markers comprises a grid of vertical and horizontal lines.

10. An apparatus according to claim 8, in which the platform is provided with two adjustable clamps arranged respectively to engage and to restrain the two hips of a patient standing on the platform, and a pair of adjustable blocks for restraining movement of the feet of the patient.

11. An apparatus according to claim 10, in which the adjustable clamps are in the form of vertically extending channels of substantially V cross section, the open side of each V being directed towards the patient.

12. An apparatus according to claim 10, in which said weight measuring devices are provided inwardly of said pair of adjustable blocks 13. An apparatus according to claim 12, in which the upper surface of each weight measuring device is provided with graduations which permit reading of the orientation of a patient's foot on that weight measuring device.

14. An apparatus according to claim 8, in which the guide means include a central spindle locating the platform against sideward movement relative to the base member, a plurality of rotatable bearing means carried by the base member at different angular orientations about the central spindle and at different radial distances from that central spindle, and a rigid bearing surface carried by the platform to transmit the weight of the platform and any patient thereon to the rotatable bearing means and thus to the base member.

15. An apparatus according to claim 14 wherein said rotatable bearing means comprise ball bearings.

16. An apparatus for taking multiple X-ray photographs of the legs and pelvis of a patient, comprising a base member, a platform on which a patient can stand and which is mounted on the base member, two separate weight measuring devices mounted on said platform to indicate respectively the weight borne by the two fee of said patient, guide means restraining the platform to rotation about a vertical axis between plurality of orientations relative to said base member, racks mounted on said base member for the reception of vertically extending flat X-ray film cassettes, the base member, the platform and all parts rotatable with the platform permitting radiation in sequence of X-ray film cassettes in different said racks with only minor vertical and horizontal adjustment of an associated substantially point source of X-rays, first and second vertical sheets of material transparent to X-rays mounted on the base member and extending parallel to one another at different radial distances from the said vertical axis, on the first sheet a first arrangement of radio opaque markers and on the second sheet a second arrangement of radio opaque markers, the relative positions of images of the first and second arrangements of markers on an exposed X-ray film providing information for composition of distortions in images on the X-ray film due to the use of a substantially point source of X-rays.

17. An apparatus as claimed in claim 16, in which the first arrangement of markers comprises a plurality of horizontally and vertically spaced dots, and the second arrangement of markers comprises a grid of vertical and horizontal lines.

18. An apparatus according to claim 16, in which the platform is provided with two adjustable clamps arranged respectively to engage and to restrain the two hips of a patient standing on the platform, and adjustable blocks for restraining movement of the feet of the patient.

19. An apparatus according to claim 18, in which the adjustable clamps are in the form of vertically extending channels of substantially V cross section, the open side of each V being directed towards the patient.

20. An apparatus according to claim 18, in which said separate weight measuring devices are provided inwardly of said pair of adjustable blocks.

21. An apparatus according to claim 20, in which the upper surface of each weight measuring device is provided with graduations which permit reading of the orientation of a patient's foot on that weight measuring device.

22. An apparatus according to claim 16, in which the guide means include a central spindle locating the platform against sideward movement relative to the base member, a plurality of rotatable bearing means carried by the base member at different angular orientations about the central spindle and at different radial distances from that central spindle, and a rigid bearing surface carried by the platform to transmit the weight of the platform and any patient thereon to the rotatable bearing means and thus to the base member.

23. An apparatus according to claim 22 wherein said rotatable bearing means comprise ball bearings.

* * * * *